United States Patent
Dubay et al.

(10) Patent No.: US 10,752,279 B2
(45) Date of Patent: Aug. 25, 2020

(54) LOW PROFILE STEERING COLUMN CLAMP MECHANISM

(71) Applicant: STEERING SOLUTIONS IP HOLDING CORPORATION, Saginaw, MI (US)

(72) Inventors: Robert W. Dubay, Saginaw, MI (US); Damian Z. Gosztyla, Bay City, MI (US); Mathew T. Vincent, Saginaw, MI (US); Robert D. Bueche, Montrose, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 157 days.

(21) Appl. No.: 16/001,214

(22) Filed: Jun. 6, 2018

(65) Prior Publication Data

US 2019/0375444 A1    Dec. 12, 2019

(51) Int. Cl.
  *B62D 1/184* (2006.01)

(52) U.S. Cl.
  CPC ..................... *B62D 1/184* (2013.01)

(58) Field of Classification Search
  None
  See application file for complete search history.

(56) References Cited

U.S. PATENT DOCUMENTS

| | | | | |
|---|---|---|---|---|
| 5,570,610 A * | 11/1996 | Cymbal | .............. | B62D 1/184 74/493 |
| 6,036,228 A * | 3/2000 | Olgren | .............. | B62D 1/184 280/775 |
| 6,637,285 B2 * | 10/2003 | Jolley | .............. | B62D 1/184 74/492 |
| 6,695,350 B2 * | 2/2004 | Uphaus | .............. | B62D 1/184 280/775 |
| 7,415,908 B2 * | 8/2008 | Zernickel | .............. | B62D 1/184 280/775 |
| 7,621,197 B2 * | 11/2009 | Manwaring | .............. | B62D 1/184 280/775 |
| 7,640,824 B2 * | 1/2010 | Manwaring | .............. | B62D 1/184 74/492 |
| 7,730,804 B2 * | 6/2010 | Manwaring | .............. | B62D 1/184 280/775 |
| 7,886,631 B2 * | 2/2011 | Nashef | .............. | B62D 1/184 280/775 |
| 7,963,561 B2 * | 6/2011 | Waibel | .............. | B62D 1/184 280/777 |
| 8,011,268 B2 * | 9/2011 | Okada | .............. | B62D 1/184 280/775 |

(Continued)

FOREIGN PATENT DOCUMENTS

| | | | | |
|---|---|---|---|---|
| DE | 102008023997 A1 * | 11/2009 | ....... | B60R 25/02153 |
| FR | 3075743 A1 * | 6/2019 | ............ | B62D 1/184 |

(Continued)

*Primary Examiner* — Nicole T Verley
(74) *Attorney, Agent, or Firm* — Dickinson Wright PLLC

(57) ABSTRACT

A lever assembly includes a lever, a first lever member, and a second lever member. The first lever member has a first lever member first portion and a first lever member second portion. The first lever member first portion defines a first opening and a notch. The second lever member defines a tab that extends into the notch and a first post that extends into the first opening to connect the second lever member to the first lever member first portion.

16 Claims, 3 Drawing Sheets

(56) References Cited

U.S. PATENT DOCUMENTS

| | | | | |
|---|---|---|---|---|
| 8,047,096 B2 * | 11/2011 | Ridgway | ................ | B62D 1/184 280/775 |
| 8,342,574 B2 * | 1/2013 | Bahr | ...................... | B62D 1/184 280/775 |
| 8,443,695 B2 * | 5/2013 | Cymbal | ................. | B62D 1/184 280/777 |
| 8,882,147 B2 * | 11/2014 | Schnitzer | ............... | B62D 1/195 280/775 |
| 8,888,131 B2 * | 11/2014 | Anspaugh | .............. | B62D 1/184 280/775 |
| 9,162,701 B2 * | 10/2015 | Buzzard | ................. | B62D 1/195 |
| 9,393,986 B1 * | 7/2016 | Anspaugh | .............. | B62D 1/184 |
| 9,415,793 B2 * | 8/2016 | Kubota | .................. | B62D 1/184 |
| 9,522,693 B2 * | 12/2016 | Tomaru | ................. | B62D 1/184 |
| 9,764,757 B2 * | 9/2017 | Buzzard | ................. | B62D 1/184 |
| 9,849,905 B2 * | 12/2017 | Anspaugh | .............. | B62D 1/184 |
| 9,969,420 B2 * | 5/2018 | Ishii | ........................ | B62D 1/189 |
| 10,000,229 B2 * | 6/2018 | Matsuno | ................ | B62D 1/184 |
| 10,093,339 B2 * | 10/2018 | Bodtker | ................ | B62D 1/184 |
| 2003/0226943 A1 * | 12/2003 | Laisement | ............ | B62D 1/184 248/230.2 |
| 2005/0178231 A1 * | 8/2005 | Schick | .................. | B62D 1/184 74/493 |
| 2006/0196302 A1 * | 9/2006 | Hochmuth | ............ | B62D 1/184 74/492 |
| 2006/0273567 A1 * | 12/2006 | Fix | ........................ | B62D 1/184 280/775 |
| 2006/0273568 A1 * | 12/2006 | Manwaring | ........... | B62D 1/195 280/777 |
| 2009/0019963 A1 * | 1/2009 | Hubrecht | ............... | B62D 1/184 74/493 |
| 2016/0272234 A1 * | 9/2016 | Terasawa | ............. | B62D 1/184 |
| 2017/0057535 A1 * | 3/2017 | Vermeersch | ........... | B62D 1/184 |
| 2017/0057536 A1 * | 3/2017 | Vermeersch | ........... | B62D 1/184 |

FOREIGN PATENT DOCUMENTS

| | | | | |
|---|---|---|---|---|
| JP | 5954573 B2 * | 7/2016 | | |
| WO | WO-2009153166 A1 * | 12/2009 | ............. | B62D 1/184 |
| WO | WO-2012103912 A2 * | 8/2012 | ............. | B62D 1/184 |

* cited by examiner

LOW PROFILE STEERING COLUMN CLAMP MECHANISM

BACKGROUND

An adjustable steering column assembly may be provided with a mechanism that enables the steering column assembly to be adjusted along the steering column axis or tilted about a pivot axis. The mechanism that enables adjustment generally employs a locking system to maintain a selected position of the adjustable steering column assembly relative to an operator of the vehicle.

SUMMARY

Disclosed is a lever assembly provided with a steering column that includes a lever, a first lever member, and a second lever member. The lever has an extension member that extends from a first lever end. The first lever member has a first lever member first portion and a first lever member second portion. The first lever member first portion defines a first opening and a notch. The first lever member first portion engages the extension member. The first lever member second portion extends from the first lever member portion. The second lever member defines a tab that extends into the notch and a first post that extends into the first opening to connect the second lever member to the first lever member first portion.

Also disclosed is a lever assembly that includes a lever, a first lever member, and a second lever member. The lever has a first lever side and a second lever side, each extending between a first lever end and a second lever end. The first lever member has a first lever member first portion and a first lever member second portion. The first lever member first portion defines a first opening that extends from a first lever member first side towards a first lever member second side. The first lever member first side is arranged to engage the second lever side. The first lever member second portion extends from the first lever member portion. The first lever member second portion extends into the lever. The second lever member has a second lever member first side and a second lever member second side extending between a second lever member first end and a second lever member second end. The second lever member defines a first post that extends from second lever member first side and into the first opening.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
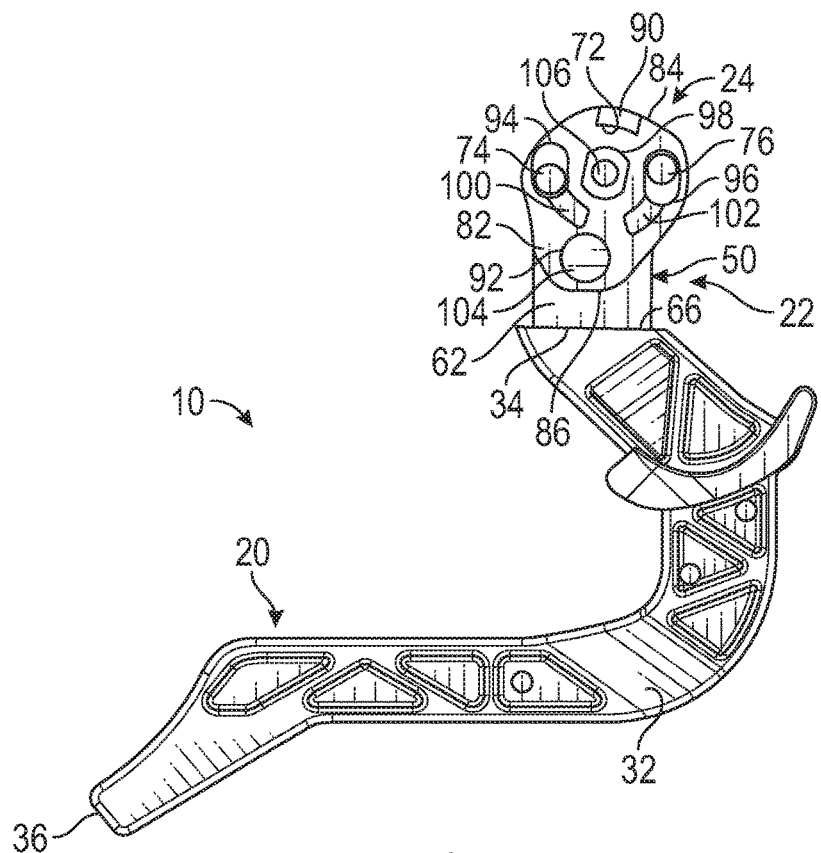
FIG. 1 is a first view of a lever assembly.
Figure 2:
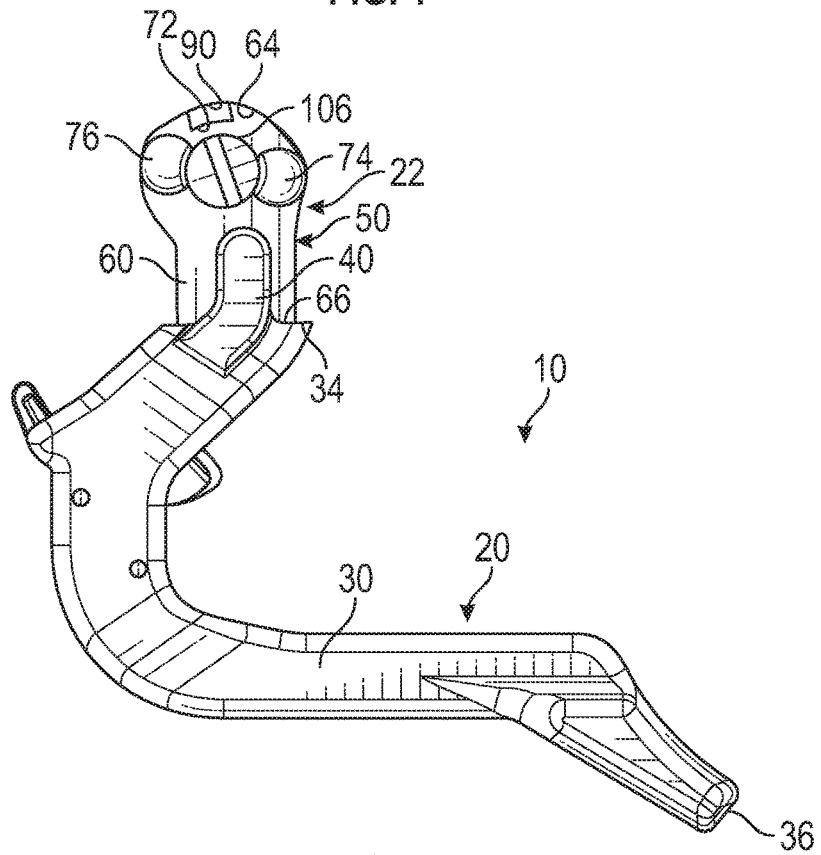
FIG. 2 is a second view of the lever assembly.

Referring to FIGS. 1 and 2, a lever assembly 10 that may be provided with an adjustable steering column assembly. The adjustable steering column assembly may be extendable or retractable along a steering column axis and may be pivotable or tiltable about a pivot axis or a tilt axis that is disposed generally transverse to the steering column axis.

The lever assembly 10 is movable between a locked position that inhibits the adjustment of the steering column assembly while maintaining a current position of the steering column assembly relative to an operator of the vehicle and an unlocked position that facilitates or permits the adjustment (e.g. extension, retraction, tilting, or pivoting) of the steering column assembly relative to the operator of the vehicle.

The lever assembly 10 includes a clamp mechanism or a locking assembly and has a narrower cross car width as compared to other lever assembly designs. The lever assembly 10 includes a lever 20, a first lever member 22, and a second lever member 24.

Figure 4:
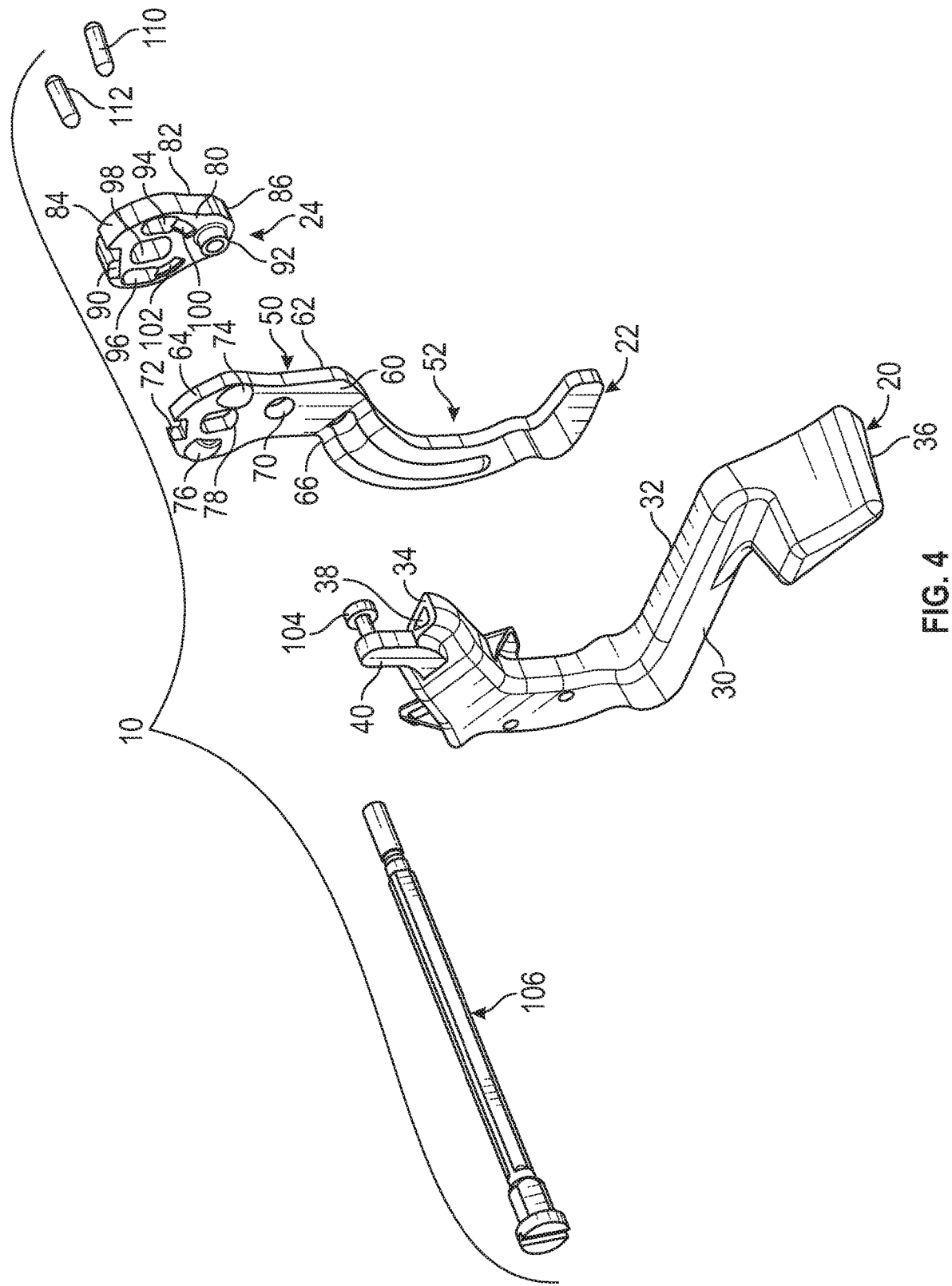
FIG. 4 is a disassembled view of the lever assembly.

Referring to FIGS. 1, 2, and 4, the lever 20 includes a first lever side 30 and a second lever side 32 that is disposed opposite the first lever side 30. The first lever side 30 and the second lever side 32 each extend between a first lever end 34 and a second lever end 36. The first lever side 30 may be an outside surface of the lever 20, as shown in FIG. 2. The second lever side 32 may be an inner surface of the lever 20, as shown in FIG. 1.

In at least one embodiment, the lever 20 may be a hollow member that defines a receiving region or cavity 38, as shown in FIG. 4, that extends from the first lever end 34 towards the second lever end 36 and is defined between the first lever side 30 and the second lever side 32.

The second lever end 36 may at least partially define a handle of the lever 20 upon which an operator of the vehicle may grasp to move the lever assembly 10 between the locked position and the unlocked position.

Figure 3:
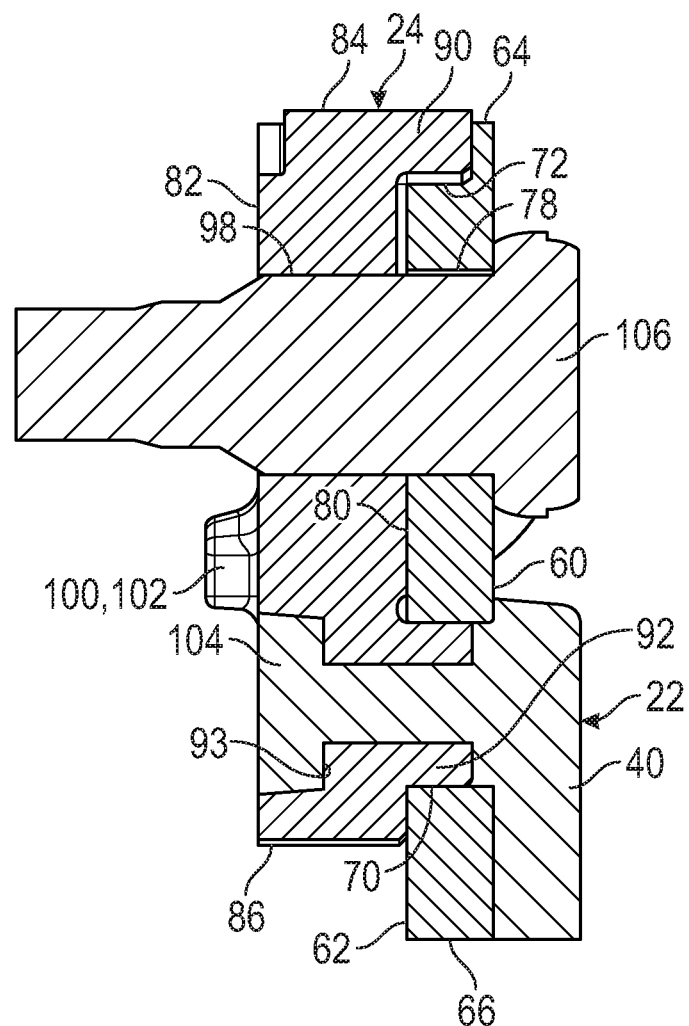
FIG. 3 is a partial section view of the lever assembly.

The lever 20 defines an extension member 40 that extends from proximate the first lever end 34, as shown in FIGS. 2-4. The extension member 40 may extend from the first lever side 30 and is arranged as a finger, a tab, or a protrusion that extends beyond the first lever end 34 in a direction that extends from the second lever end 36 towards the first lever end 34.

The first lever member 22 is arranged to be at least partially received within the lever 20 or is arranged to abut a side of the lever 20. The first lever member 22 may be a stamped metallic component. The first lever member 22 includes a first lever member first portion 50 and a first lever member second portion 52 that extends from the first lever member first portion 50.

Referring to FIGS. 2, 3, and 4, the first lever member first portion 50 engages the extension member 40 and/or the second lever side 32. The first lever member first portion 50 includes a first lever member first side 60 and a first lever member second side 62 that is disposed opposite the first lever member first side 60. The first lever member first side 60 and the first lever member second side 62 each extend between a first lever member first end 64 and a first lever member second end 66. The first lever member second end 66 is disposed within the lever 20, as shown in FIGS. 1 and 2.

The first lever member first portion 50 defines a first opening 70, a notch 72, a first pocket 74, a second pocket 76, and a second opening 78. The first opening 70 extends from the first lever member first side 60 towards the first lever member second side 62. The notch 72 extends from the first lever member first end 64 towards the first lever member second end 66. The first pocket 74 and the second pocket 76 each extend from the first lever member second side 62 towards the first lever member first side 60. At least one of the first pocket 74 and the second pocket 76 does not extend completely through the first lever member first portion 50. The second opening 78 is disposed between the first pocket 74 and the second pocket 76. The second opening 78 extends from the first lever member first side 60 towards the first lever member second side 62.

The first lever member second portion 52 extends from the first lever member second end 66 of the first lever member first portion 50. The first lever member second portion 52 extends into the lever 20, as shown in FIGS. 1 and 2. In at least one embodiment, the first lever member second portion 52 is disposed against or is arranged to engage the second lever side 32. The first lever member second portion 52 may extend towards the second lever end 36.

The second lever member 24 is arranged to engage the first lever member first portion 50 of the first lever member 22, as shown in FIGS. 1 and 3. The second lever member 24 may be a powdered metal component.

The second lever member 24 includes a second lever member first side 80 and a second lever member second side 82 that is disposed opposite the second lever member first side 80. The second lever member first side 80 and the second lever member second side 82 each extend between a second lever member first end 84 and a second lever member second end 86. The second lever member first side 80 is arranged to engage the first lever member second side 62 of the first lever member first portion 50.

The second lever member 24 defines a tab 90, a first post 92, a first pass through 94, a second pass through 96, a second lever member opening 98, a first travel stop 100, and a second travel stop 102.

The tab 90 is disposed proximate the second lever member first end 84 and extends from the second lever member first side 80. The tab 90 is arranged to extend into the notch 72 of the first lever member first portion 50.

The first post 92 is disposed proximate the second lever member second end 86 and extends from the second lever member first side 80. The first post 92 extends into the first opening 70 of the first lever member portion 50 to connect the second lever member 24 to the first lever member first portion 50. The first post 92 is arranged to prevent relative rotation between the first lever member 22 and the second lever member 24.

The first post 92 may define a central opening that extends through the first post 92 and through the second lever member first side 80 and the second lever member second side 82. A pocket 93 may be defined by the second lever member 24 and extends from the second lever member second side 82 towards the second lever member first side 80.

A fastening member 104 may be provided to couple the lever 20 to the first lever member 22 and the second lever member 24. The fastening member 104 may be a rivet or the like, that extends from proximate the first lever end 34 and into the first post 92 or extends from the extension member 40 of the lever 20 and into at least one of the first opening 70 of the first lever member 22 and the first post 92 of the second lever member 24 to couple the lever 20 to the first lever member 22 and the second lever member 24, as shown in FIGS. 1, 3, and 4. The fastening member 104 is used to positively retain the first lever member 22 and the second lever member 24 to each other. A head of the fastening member 104 may be received within the pocket 93 to aid in retention of the lever 20 to the second lever member 24.

The first pass through 94 extends between the second lever member first side 80 and the second lever member second side 82. The first pass through 94 is proximately aligned with the first pocket 74 of the first lever member 22. The second pass through 96 is spaced apart from the first pass through 94 and extends between the second lever member first side 80 and the second lever member second side 82. The second pass through 96 is proximately aligned with the second pocket 76 of the first lever member 22. The first pass through 94 and the second pass through 96 each extend completely through the second lever member 24.

The second lever member opening 98 is disposed between the first pass through 94 and the second pass through 96. The second lever member opening 98 is disposed between the tab 90 and the first post 92. The second lever member opening 98 extends from the second lever member first side 80 towards the second lever member second side 82. The second lever member opening 98 extends completely through the second lever member 24.

A fastener 106 extends through the second opening 78 of the first lever member 22 and the second lever member opening 98 of the second lever member along a fastener axis. The fastener 106 may be a rake bolt that couples the lever assembly 10 to the steering column assembly. The second lever member 24 provides length over diameter support to the fastener 106. The lever 20, the first lever member 22, and the second lever member 24 are all arranged to pivot about the fastener 106 responsive to movement of the lever assembly 10 between the unlocked position and the locked position.

The low-profile arrangement of the first lever member 22 and the second lever member 24 enables the fastener 106 to be disposed closer to a rake bracket of the steering column assembly. The disposing of the faster 106 closer to the rake bracket of the steering column assembly allows for more room or a more compact lever assembly 10.

The first travel stop 100 and the second travel stop 102 extend from the second lever member second side 82, as shown in FIGS. 1 and 3. The first travel stop 100 is disposed proximate the first pass through 94. The second travel stop 102 is disposed proximate the second pass through 96. The first travel stop 100 is arranged to engage a portion of the steering column assembly when the lever assembly 10 is in the unlocked position or is rotating towards the unlocked position. The engagement between the first travel stop 100 and the portion of the steering column assembly inhibits further rotation of the lever assembly 10 towards or beyond the unlocked position. The second travel stop 102 is arranged to engage a portion of the steering column assembly when the lever assembly 10 is in the locked position or is rotating towards the locked position. The engagement between the second travel stop 102 and the portion of the steering column assembly inhibits further rotation of the lever assembly 10 towards or beyond the locked position.

A first pivot pin or a first pin 110 is arranged to extend through the first pass through 94 of the second lever member 24 and into the first pocket 74 of the first lever member 22. A second pivot pin or a second pin 112 is arranged to extend through the second pass through 96 of the second lever member 24 and into the second pocket 76 of the first lever member 22. The first pin 110 and the second pin 112 cooperate with features of the steering column assembly that enable the first pin 110 and the second pin 112 to facilitate the locking and unlocking of the lever assembly 10.

The first pin 110, the second pin 112, the second lever member 24, and the first lever member first portion 50 of the first lever member 22 at least partially define the low-profile locking assembly or the low-profile clamp mechanism. The first pin 110 and the second pin 112 may be tilted relative to the fastener 106 or the axis along which the fastener 106 extends to selectively apply a clamp load to the fastener 106 to lock or unlock the steering column assembly.

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A lever assembly provided with a steering column, comprising:
   a lever having an extension member that extends from a first lever end;
   a first lever member having
   a first lever member first portion defining a first opening and a notch, the first lever member first portion engages the extension member, and
   a first lever member second portion extending from the first lever member portion; and
   a second lever member defining a tab that extends into the notch and a first post that extends into the first opening to connect the second lever member to the first lever member first portion, wherein the first lever member first portion defines a first pocket and a second pocket, wherein the first lever member first portion defines a second opening that is disposed between the first pocket and the second pocket.

2. The lever assembly of claim 1, further comprising a fastening member that extends from the extension member and into at least one of the first opening and the first post to couple the lever to the first lever member and the second lever member.

3. A lever assembly provided with a steering column, comprising:
   a lever having an extension member that extends from a first lever end;
   a first lever member having
   a first lever member first portion defining a first opening and a notch, the first lever member first portion engages the extension member, and
   a first lever member second portion extending from the first lever member portion; and
   a second lever member defining a tab that extends into the notch and a first post that extends into the first opening to connect the second lever member to the first lever member first portion, wherein the first lever member first portion defines a first pocket and a second pocket, wherein the second lever member defines a first pass through that is proximately aligned with the first pocket and a second pass through that is proximately aligned with the second pocket, further comprising:
   a first pin that extends through the first pass through and into the first pocket; and
   a second pin that extends through the second pass through and into the second pocket.

4. The lever assembly of claim 3, further comprising a fastening member that extends from the extension member and into at least one of the first opening and the first post to couple the lever to the first lever member and the second lever member.

5. A lever assembly provided with a steering column, comprising:
   a lever having an extension member that extends from a first lever end;
   a first lever member having
   a first lever member first portion defining a first opening and a notch, the first lever member first portion engages the extension member, and
   a first lever member second portion extending from the first lever member portion; and
   a second lever member defining a tab that extends into the notch and a first post that extends into the first opening to connect the second lever member to the first lever member first portion, wherein the first lever member first portion defines a first pocket and a second pocket, wherein the second lever member defines a first pass through that is proximately aligned with the first pocket and a second pass through that is proximately aligned with the second pocket, wherein the second lever member defines a second lever member opening that is disposed between the first pass through and the second pass through.

6. The lever assembly of claim 5, further comprising a fastening member that extends from the extension member and into at least one of the first opening and the first post to couple the lever to the first lever member and the second lever member.

7. A lever assembly, comprising:
   a lever having a first lever side and a second lever side, each extending between a first lever end and a second lever end;
   a first lever member having
   a first lever member first portion defining a first opening that extends from a first lever member first side towards a first lever member second side, the first lever member first side arranged to engage the second lever side, and
   a first lever member second portion extending from the first lever member first portion, the first lever member second portion extending into the lever; and
   a second lever member having a second lever member first side and a second lever member second side extending between a second lever member first end and a second lever member second end, the second lever member defining a first post that extends from second lever member first side and into the first opening, wherein the first lever member first portion defines at least one of a first pocket and a second pocket that extends from the first lever member second side towards the first lever member first side, wherein the second lever member defines at least one of a first pass through and a second pass through that extends between the second lever member first side and the second lever member second side, wherein at least one of the first pocket and the second pocket is proximately aligned with at least one of the first pass through and the second pass through.

8. The lever assembly of claim 7, wherein the lever further comprising a fastening member that extends from proximate the first lever end and into the first post.

9. A lever assembly, comprising:
a lever having a first lever side and a second lever side, each extending between a first lever end and a second lever end;
a first lever member having
a first lever member first portion defining a first opening that extends from a first lever member first side towards a first lever member second side, the first lever member first side arranged to engage the second lever side, and
a first lever member second portion extending from the first lever member first portion, the first lever member second portion extending into the lever; and
a second lever member having a second lever member first side and a second lever member second side extending between a second lever member first end and a second lever member second end, the second lever member defining a first post that extends from second lever member first side and into the first opening, wherein the first lever member first portion defines at least one of a first pocket and a second pocket that extends from the first lever member second side towards the first lever member first side, wherein the second lever member defines at least one of a first pass through and a second pass through that extends between the second lever member first side and the second lever member second side, further comprising a first pin that is arranged to extend through the first pass through and into the first pocket.

10. The lever assembly of claim 9, wherein the lever further comprising a fastening member that extends from proximate the first lever end and into the first post.

11. A lever assembly, comprising:
a lever having a first lever side and a second lever side, each extending between a first lever end and a second lever end;
a first lever member having
a first lever member first portion defining a first opening that extends from a first lever member first side towards a first lever member second side, the first lever member first side arranged to engage the second lever side, and
a first lever member second portion extending from the first lever member portion, the first lever member second portion extending into the lever; and
a second lever member having a second lever member first side and a second lever member second side extending between a second lever member first end and a second lever member second end, the second lever member defining a first post that extends from second lever member first side and into the first opening, wherein the first lever member first side and the first lever member second side each extend between a first lever member first end and a first lever member second end, wherein the first lever member defines a notch that extends from the first lever member first end towards the first lever member second end, wherein the second lever member defines a tab that extends from second lever member first side and into the notch.

12. The lever assembly of claim 11, wherein the lever further comprising a fastening member that extends from proximate the first lever end and into the first post.

13. A lever assembly, comprising:
a lever having a first lever side and a second lever side, each extending between a first lever end and a second lever end;
a first lever member having
a first lever member first portion defining a first opening that extends from a first lever member first side towards a first lever member second side, the first lever member first side arranged to engage the second lever side, and
a first lever member second portion extending from the first lever member portion, the first lever member second portion extending into the lever; and
a second lever member having a second lever member first side and a second lever member second side extending between a second lever member first end and a second lever member second end, the second lever member defining a first post that extends from second lever member first side and into the first opening, wherein the first lever member first portion defines a second opening that extends from the first lever member first side towards the first lever member second side and is spaced apart from the first opening.

14. The lever assembly of claim 13, wherein the second lever member defines a second lever member opening that extends from the second lever member first side towards the second lever member second side.

15. The lever assembly of claim 14, further comprising a fastener that extends through the second opening and the second lever member opening.

16. The lever assembly of claim 13, wherein the lever further comprising a fastening member that extends from proximate the first lever end and into the first post.

* * * * *